United States Patent [19]

Nikolaev et al.

[11] 4,422,876

[45] Dec. 27, 1983

[54] METHOD FOR PREPARING PLUGGING MATERIAL

[76] Inventors: Nikolai I. Nikolaev, V.O. 5 linia, 18, kv. 9; Lev A. Tereschenko, ulitsa Gurdina, 5, kv. 34; Arian M. Yakovlev, Grazhdansky prospekt, 5, korpus 1, kv. 210; Vitaly I. Kovalenko, ulitsa Esenina, 40, korpus 1, kv. 160, all of Leningrad; Ruben A. Tatevosian, ulitsa Gorkogo, 4, kv. 60; Mikhail Y. Titov, ulitsa Kominterna, 34/6, kv. 83, both of Moscow; Nikolai K. Lipatov, ulitsa Zinovieva, 2, kv. 96, Apatity, Murmanskaya oblast, all of U.S.S.R.

[21] Appl. No.: 343,509

[22] Filed: Jan. 28, 1982

[30] Foreign Application Priority Data

Apr. 27, 1981 [SU] U.S.S.R. ................................. 3270006

[51] Int. Cl.$^3$ ............................................. C04B 7/32
[52] U.S. Cl. .................................................... 106/104
[58] Field of Search ................................... 106/89, 104

[56] References Cited

U.S. PATENT DOCUMENTS 4,242,141 12/1980 Rogov et al. ........................ 106/89
4,353,746 10/1982 Birchall et al. ..................... 106/104

OTHER PUBLICATIONS

Berezhnoy et al.; Electrical & Mechanical Method in Well Grouting [Russian with Translation].

*Primary Examiner*—James Poer
*Attorney, Agent, or Firm*—Murray Schaffer

[57] ABSTRACT

A method for preparing a plugging material of an alumina-base cement, by mechanical stirring of alumina cement with additives of the pre-rated quantities to improve the physical and mechanical characteristics of the plugging material. The stirring is effected by magnetized working bodies in an alternating electromagnetic field. The resultant material is subjected to a batch forming by compression at a pressure between 50 and 120 MN/m$^2$.

1 Claim, No Drawings

METHOD FOR PREPARING PLUGGING MATERIAL

The invention relates to the field of well drilling, and more particularly it deals with methods for preparing plugging material.

A plugging material prepared in accordance with the invention may be most preferably used in geological prospecting, engineering exploration, oil and gas production and drilling operations for elimination of troublesome zones, in plugging back and making isolating bridges and for plugging of abandoned use.

In performing such operations, the ability of plugging material to expand cubically is very important, and this property depends on both chemical composition of the material and method of preparation.

Known in the art is a method for preparing plugging materials, by mixing dry components and comminuting them together in a disintegrator (cf. A. I. Berezhnoy, P. Ya. Zeltser, A. G. Mukha, Electrical and Mechanical Method in Well Grouting (in Russian), M., Nedra Publishing House, 1976, pp. 23-25).

Known in the art is also a method for preparing a plugging material, comprising mechanically stirring of powered alumina cement with required pre-rated additives improving the life, adhesion, and strength properties of the material and lowering the setting time. Stirring is conducted using magnetized pellets in an alternating electromagnetic field, the pellets being partly or completely made of the additive material and moving chaotically in the field, the additives being added owing to the attrition of the pellets during the stirring (cf. U.S. Pat. No. 4,242,141, Cl. 106-89).

The majority of basic characteristics of materials prepared using the prior art method comply with requirements imposed upon plugging materials, however, their cubical expansion during hardening is relatively small and inadequate for forming normal-grade structures in wells during drilling.

It is an object of the invention to improve physical and mechanical properties of a plugging material, especially the degree of its cubical expansion.

With the above object is in view, there is provided a method for preparing a plugging materal based on alumina cement, by mechanical stirring of cement with additives of the pre-rated quantities to improve physical and chemical characteristics of the material added in pre-set ratios, the stirring being effected by magnetized working bodies in an alternating electromagnetic field, the resultant material is subjected to a batch forming by compression at a pressure between 50 and 120 MN/m$^2$.

The method for preparing a plugging material according to the invention makes it possible to prepare a plugging material having a greater degree of cubical expansion, improved compression strength and greater cohesion with rocks of borehole walls compared to materials prepared by conventional methods.

The method according to the invention substantially consists in the following.

Starting materials are placed in a chamber accommodated in the interior of an electromagnetic coil-solenoid-which is connected to alternating current supply mains. Working bodies in the form of magnetized spherical particles of barium hexaferrite which are present in the chamber as an additive are caused to move chaotically under the action of an alternating electromagnetic field and are partially worn away. Owing to high mobility of the working bodies an intense stirring of material components occurs. The treated material is fed from the chamber of the electromagnetic coil-solenoid-through a batcher to the interior of a pressing chamber wherein the material is formed by means of pressing members (male dies) at a pressure between 50 and 120 MN/m$^2$.

The limit pressure values have been determined as a result of experimental studies.

The lower limit of pressure of 50 MN/m$^2$ for forming plugging materials based on alumina cement is determined by minimum desired mechanical strength of the resultant product (tablets, briquets, pellets). This pressure corresponds to the breaking force of 0.5 MN when the product is tested in the edgewise position.

The strength of products grows with an increase in the pressing force between 50 and 120 MN/m$^2$ (see Table A).

TABLE A

| Pressing force, MN/m$^2$ | 50 | 60 | 70 | 80 | 100 | 120 | 150 | 200 |
|---|---|---|---|---|---|---|---|---|
| Breaking force in edgewise test, MN | 0.5 | 0.7 | 0.8 | 1.0 | 1.2 | 1.3 | 1.3 | 1.3 |
| Pressing force, MN/m$^2$ | 250 | | 300 | | 350 | | | |
| Breaking force in edgewise test, MN | 1.3 | | 0.5 | | 0.5 | | | |

There is no strength increase in the range of pressing forces between 120 and 250 MN/m$^2$. With pressing forces below 50 MN/m$^2$ the product is broken during packing and transportation.

Too high pressing forces (above 250 MN/m$^2$) result in cleavage cracks under the action of residual resilience forces and internal stresses in the tablet.

As a result of the tests, the range of pressing forces for forming plugging materials was limited between 50 and 120 MN/m$^2$.

Examples of practical realization of the invention for materials of various compositions are given below.

EXAMPLE 1

The following starting materials were used:
alumina cement, grade 400 (compression strength 400 kg/cm$^2$)-50 g;
hemihydrated gypsum-50 g.

The starting materials were placed in a chamber of an electromagnetic coil of 50 mm in diameter supplied with an alternating current at 220 V.

The lower part of the chamber was covered by a screen with 3×3 mm openings. The chamber was filled with 100 working bodies of 5 mm in diameter made of pre-magnetized barium hexaferrite. The time of contact of the material with the working bodies was 5 s. During this time 1 g of barium hexaferrite was released into the material as a result of attrition of the working bodies. The resultant material was fed to a pressing chamber of an automatic tableting press in the form of 1 g batches to form under pressure of 50 MN/m$^2$. Tablets 10 mm in diameter and 5 mm thick were obtained.

In using the materials prepared by the prior art method and by the method according to the invention plugging slurries were obtained, and the results of comparative tests of these slurries are given in Table 1.

EXAMPLE 2

Caked grade 400 alumina cement was used as starting material. The cement was placed in the same chamber of the electromagnetic coil filled with the same working bodies, with the contact time 5 s. 50 g of the material was in the chamber at a time. The processed cement was fed to the chamber of the same press in the form of 1 g batches for forming at a pressure of 80 MN/cm². Tablets 10 mm in diameter and 4 mm thick were obtained.

The results of tests of the slurries prepared from conventional powered cement and from cement tablets are given in Table 2.

EXAMPLE 3

The following starting materials were used:
alumina cement, grade 400-70 g;
hemihydrated gypsum-30 g.

After the treatment similar to that described in Examples 1 and 2, the material was formed into 1 g batches and pressed at a pressure of 120 MN/m². Tablets 10 mm in diameter and 3.5 mm thick were obtained.

In using the materials prepared by prior art method and by the method according to the invention plugging slurry were obtained, and the results of comparative tests are given in Table 3.

The use of the method according to the invention makes it possible to prepare plugging materials with improved physical and mechanical characteristics so as to ensure high quality of such operations as plugging of troublesome zones, plugging back making isolating bridges, and plugging abandoned wells.

TABLE 1

| Tested sample | Water-cement ratio | Setting time in minutes beginning | Setting time in minutes end | Cubical expansion, % in 3 days | Cubical expansion, % in 7 days | Single-axis compression strength in 24 h., kg/cm² water curing | Single-axis compression strength in 24 h., kg/cm² air curing | Force of cohesion of the material with quartz listvenite in 20 minutes, kg/cm² |
|---|---|---|---|---|---|---|---|---|
| Material prepared by the prior art method | 0,35 | 5 | 6 | 5,2 | 7,0 | 160 | 155 | 1,7 |
|  | 0,5 | 19 | 22 | 4,7 | 6,8 | 100 | 125 | 0,5 |
|  | 0,7 | 23 | 27 | 3,5 | 5,0 | 70 | 80 | 0,2 |
| Material prepared by the method according to the invention | 0,35 | 2 | 4 | 8,5 | 15,0 | 260 | 250 | 2,2 |
|  | 0,5 | 10 | 11 | 6,8 | 14,1 | 170 | 200 | 1,4 |
|  | 0,7 | 17 | 20 | 4,2 | 9,8 | 105 | 120 | 0,8 |

TABLE 2

| Tested sample | Water-cement ratio | Setting time, h. beginning | Setting time, h. end | Cubical expansion in 24 h, % | Single-axis compression strength in 24 h, kg/cm² water curing | Single-axis compression strength in 24 h, kg/cm² air curing |
|---|---|---|---|---|---|---|
| Slurry prepared by the prior art method | 0,35 | 7,5 | 8,0 | 2,0 | 150 | 180 |
|  | 0,5 | 16,0 | 16,5 | 1,5 | 120 | 150 |
|  | 0,7 | 20,0 | 22,0 | 0,2 | 25 | 30 |
| Slurry prepared by the method according to the invention | 0,35 | 5,0 | 6,0 | 3,0 | 190 | 220 |
|  | 0,5 | 13,5 | 14,5 | 2,4 | 160 | 200 |
|  | 0,7 | 18,0 | 19,0 | 0,3 | 40 | 45 |

TABLE 3

| Tested sample | Water-cement ratio | Setting time, h. beginning | Setting time, h. end | Cubical expansion in 24 h., % | Single-axis compression strength in 24 h, kg/cm² water curing | Single-axis compression strength in 24 h, kg/cm² air curing | Force of material cohesion with quartz listvenite in 1 h., kg/cm² |
|---|---|---|---|---|---|---|---|
| Material prepared by the prior art method | 0,35 | 1,0 | 1,2 | 1,2 | 125 | 120 | 1,2 |
|  | 0,5 | 1,5 | 2,0 | 0.8 | 90 | 95 | 0,4 |
|  | 0,7 | 2,2 | 2,5 | 0,3 | 40 | 50 | 0,2 |
| Material prepared by the method according to the invention | 0,35 | 0,5 | 0,7 | 1,8 | 170 | 165 | 1,9 |
|  | 0,5 | 1,0 | 1,4 | 1,3 | 130 | 140 | 1.0 |
|  | 0,7 | 1,8 | 2,0 | 0,5 | 60 | 80 | 0,3 |

We claim:

1. A method for preparing a body of plugging material of an alumina-base cement for in-situ cubic expansion on application of water thereto, comprising the steps of mechanically stirring dry alumina cement having dry additives of prerated quantities to improve the physical and mechanical characteristics of the plugging material, said stirring being effected by magnetized working bodies in an alternating electromagnetic field thereafter batch forming said stirred material into a body of determined shape conforming substantially to the body desired for in-situ application, and subsequently compressing said shaped body from all sides at a pressure of between 50 and 120 MN/m² to obtain a further compacted body.

* * * * *